(12) United States Patent
Qi et al.

(10) Patent No.: US 12,106,197 B2
(45) Date of Patent: Oct. 1, 2024

(54) LEARNING PARAMETER SAMPLING CONFIGURATION FOR AUTOMATED MACHINE LEARNING

(71) Applicant: International Business Machines Corporation, Armonk, NY (US)

(72) Inventors: Haode Qi, Cambridge, MA (US); Ming Tan, Malden, MA (US); Ladislav Kunc, Cambridge, MA (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 1117 days.

(21) Appl. No.: 16/829,076

(22) Filed: Mar. 25, 2020

(65) Prior Publication Data
US 2021/0304056 A1    Sep. 30, 2021

(51) Int. Cl.
*G06N 20/20* (2019.01)
*G06F 17/00* (2019.01)
(Continued)

(52) U.S. Cl.
CPC ............ *G06N 20/20* (2019.01); *G06F 17/00* (2013.01); *G06F 17/18* (2013.01); *G06F 18/213* (2023.01);
(Continued)

(58) Field of Classification Search
CPC ........ G06N 20/20; G06N 20/00; G06N 3/045; G06N 3/08; G06N 3/084; G06F 18/217; G06F 18/213; G06F 17/00; G06F 17/18
See application file for complete search history.

(56) References Cited

U.S. PATENT DOCUMENTS

| 6,516,309 B1 * | 2/2003 | Eberhart ................ G06N 3/086 |
| | | 706/14 |
| 7,894,677 B2 | 2/2011 | Konig et al. |

(Continued)

FOREIGN PATENT DOCUMENTS

| CN | 105138538 B | 8/2018 |
| CN | 108959265 A | 12/2018 |

(Continued)

OTHER PUBLICATIONS

Liang—Evolutionary Neural AutoML for Deep Learning (Year: 2019).*

(Continued)

*Primary Examiner* — Omar F Fernandez Rivas
*Assistant Examiner* — Shamcy Alghazzy
(74) *Attorney, Agent, or Firm* — Stephen J. Walder, Jr.; Stosch Sabo (57) ABSTRACT

Mechanisms are provided for performing an automated machine learning (AutoML) operation to configure parameters of a machine learning model. AutoML logic is configured based on an initial parameter sampling configuration for sampling values of parameter(s) of the machine learning (ML) model. An initial AutoML process is executed on the ML model based on a dataset utilizing the initially configured AutoML logic, to generate at least one learned value for the parameter(s) of the ML model. The dataset is analyzed to extract a set of dataset characteristics that define properties of a format and/or a content of the dataset which are stored in association with the at least one learned value as part of a training dataset. A ML prediction model is trained based on the training dataset to predict, for new datasets, corresponding new sampling configuration information based on characteristics of the new datasets.

20 Claims, 5 Drawing Sheets

(51) Int. Cl.
- *G06F 17/18* (2006.01)
- *G06F 18/21* (2023.01)
- *G06F 18/213* (2023.01)
- *G06N 3/045* (2023.01)
- *G06N 3/08* (2023.01)
- *G06N 3/084* (2023.01)
- *G06N 20/00* (2019.01)

(52) U.S. Cl.
CPC ........... *G06F 18/217* (2023.01); *G06N 3/045* (2023.01); *G06N 3/08* (2013.01); *G06N 3/084* (2013.01); *G06N 20/00* (2019.01)

(56) References Cited

U.S. PATENT DOCUMENTS

| | | | |
|---|---|---|---|
| 8,885,928 | B2 | 11/2014 | Forman |
| 9,940,323 | B2 | 4/2018 | Boyer et al. |
| 10,402,723 | B1 | 9/2019 | Silberman et al. |
| 10,417,350 | B1 | 9/2019 | Mohamed et al. |
| 10,484,399 | B1 | 11/2019 | Curtin |
| 10,489,438 | B2 | 11/2019 | Bhatt et al. |
| 2010/0169243 | A1 | 7/2010 | Su et al. |
| 2015/0095017 | A1* | 4/2015 | Mnih ............ G06F 40/216 704/9 |
| 2016/0182558 | A1 | 6/2016 | Tripp |
| 2018/0114142 | A1 | 4/2018 | Mueller |
| 2018/0225280 | A1 | 8/2018 | Dugan |
| 2018/0300576 | A1 | 10/2018 | Dalyac et al. |
| 2018/0375922 | A1 | 12/2018 | Nemati et al. |
| 2019/0034823 | A1 | 1/2019 | Thapliyal et al. |
| 2019/0095819 | A1 | 3/2019 | Varadarajan et al. |
| 2019/0121847 | A1* | 4/2019 | Castañeda-Villagrán ................ G06N 20/00 |
| 2019/0244139 | A1* | 8/2019 | Varadarajan ........... G06N 20/10 |
| 2019/0266513 | A1 | 8/2019 | Eban et al. |
| 2020/0152184 | A1* | 5/2020 | Steedman Henderson ................ G10L 15/1822 |
| 2020/0219627 | A1* | 7/2020 | Consoli ............ G16H 50/20 |
| 2020/0226475 | A1* | 7/2020 | Ma ................ G06N 3/084 |
| 2021/0232302 | A1* | 7/2021 | Wiese .............. G06F 3/04847 |
| 2021/0241177 | A1* | 8/2021 | Wang .............. G06N 20/00 |
| 2021/0344621 | A1* | 11/2021 | Kulkarni ............ G06N 5/04 |
| 2022/0156642 | A1* | 5/2022 | Schmidt ............ G06N 20/00 |
| 2022/0414868 | A1* | 12/2022 | Wang .............. G06V 10/82 |

FOREIGN PATENT DOCUMENTS

| | | |
|---|---|---|
| CN | 109308318 A | 2/2019 |
| CN | 109543031 A | 3/2019 |
| CN | 109753566 A | 5/2019 |
| CN | 110032646 A | 7/2019 |

OTHER PUBLICATIONS

Ikonomakis—Text Classification Using Machine Learning Techniques (Year: 2005).*
Techniques for Automated Machine Learning (Year: 2019).*
Bootstrapping the out-of-sample predictions for efficient and accurate cross-validation (Year: 2018).*
List of IBM Patents or Patent Applications Treated as Related, Mar. 25, 2020, 2 pages.
"Automated Machine Learning, What is Automated Machine Learning?", DataRobot, Artificial Intelligence Wiki, 2020, accessed online Feb. 17, 2020, 5 pages.
Balaji, Adithya, "Benchmarking Automatic Machine Learning Frameworks", arVix.org, arXiv:1808.06492v1 [cs.LG], Aug. 17, 2018, 9 pages.
Feurer, Matthias et al., "Efficient and Robust Automated Machine Learning", Advances in Neural Information Processing Systems 28 (NIPS 2015), Dec. 7-12, 2015, 9 pages.
He, Xin et al., "AutoML: A Survey of the State-of-the-Art", arVix.org, arXiv:1908.00709v2 [cs.LG], Aug. 14, 2019, 17 pages.
Ikonomakis, M et al., "Text Classification Using Machine Learning Techniques", WSEAS Transactions on Computers, Issue 8, vol. 4, Aug. 2005, pp. 966-974, 10 pages.
Kim, Sang-Bum et al., "Some Effective Techniques for Naive Bayes Text Classification", IEEE Transactions on Knowledge and Data Engineering, vol. 18, No. 11, Nov. 2006, pp. 1457-1466, 10 pages.
Kotthoff, Lars et al., "Auto-WEKA 2.0: Automatic model selection and hyperparameter optimization in WEKA", Journal of Machine Learning Research 17 (2016) 1-5, Published Nov. 2016, 5 pages.
Nicholson, Chris, "A.I. Wiki, A Beginner's Guide to Automated Machine Learning & AI", Pathmind Inc., 2019, accessed online Feb. 17, 2020, 8 pages.
Scheidegger, Florian M. et al., "Automatic Determination of Cognitive Models for Deployment at Computerized Devices Having Various Hardware Constraints", filed Dec. 12, 2018, U.S. Appl. No. 16/217,760.
Thomas, Gegi et al., "Creating Optimized Machine-Learning Models", filed Dec. 11, 2018, U.S. Appl. No. 16/216,138.

* cited by examiner

LEARNING PARAMETER SAMPLING CONFIGURATION FOR AUTOMATED MACHINE LEARNING

BACKGROUND

The present application relates generally to an improved data processing system, apparatus, and method for improvement of automated machine learning. More specifically, the present application provides some illustrative embodiments that relate to improved mechanisms for learning parameter sampling configurations for automated machine learning.

Different conventional techniques exist to create machine learning models and neural network models. The basic prerequisites across existing approaches include having a dataset upon which to train the machine learning model, as well as basic knowledge of ML model synthesis, neural network architecture synthesis, and coding skills. Conventionally, for obtaining models with higher refined accuracies, specialized knowledge is needed to hand-tune a machine learning model or neural network for optimal accuracy. This results in a high barrier to successfully leveraging Artificial Intelligence (AI) and/or neural network or machine learning model architectures as a new class of solutions to enterprise problems.

Automated machine learning (AutoML) is the process of automating the process of applying machine learning to real-world problems. AutoML was proposed as an artificial intelligence-based solution to the ever-growing challenge of applying machine learning. The high degree of automation in AutoML allows non-experts to make use of machine learning models and techniques without requiring these users to become an expert in the particular field first. Conventional techniques that implement AutoML mechanisms only support subsets of the data science workflow, and are mainly restricted in that only hyperparameter optimization is allowed.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided for performing an automated machine learning (AutoML) operation to configure parameters of a machine learning model. The method comprises configuring AutoML logic based on an initial parameter sampling configuration information for sampling values of at least one parameter of the machine learning (ML) model. The method further comprises executing an initial AutoML process on the ML model based on a dataset utilizing the initially configured AutoML logic, to generate at least one learned value for the at least one parameter of the ML model. In addition, the method comprises analyzing the dataset to extract a set of dataset characteristics that define properties of at least one of a format or a content of the dataset and storing the set of dataset characteristics in association with the at least one learned value as part of a training dataset. Moreover, the method comprises training a ML prediction model based on the training dataset to predict, for new datasets, corresponding new sampling configuration information based on characteristics of the new datasets, to thereby generate a trained ML prediction model.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

In machine learning applications, practitioners have a dataset consisting of input data points to train the machine learning computer models that they plan to implement. The raw data of the dataset itself may not be in a form such that all machine learning computer models may be able to operate on the raw data "out of the box." A human subject matter expert may have to apply appropriate data preprocessing, feature engineering, feature extraction, and feature selection methods that make the dataset amenable for machine learning by the particular machine learning computer model being trained. Following those preprocessing steps, human practitioners must then perform computer model selection and hyperparameter optimization to maximize the predictive performance of their machine learning model. Clearly all of these steps introduce their own challenges, provide many sources of human error, and a significant time commitment for completion, which accumulates to a significant hurdle to organizations getting started with machine learning tools.

Automated machine learning (AutoML) provides an approach to automating the process of applying machine learning to real-world problems in an attempt to reduce the burdens noted above when introducing machine learning as a tool to improve the operations performed by various organizations. However, AutoML cannot automate every aspect of training a machine learning computer model, e.g., see Chris Nicholson, "A Beginner's Guide to Automated Machine Learning & AI," Pathmind website, 2019. To the contrary, AutoML tools currently are limited to focusing primarily on tuning machine learning model hyperparameters. For example, Eclipse Arbiter is a hyperparameter optimization library that can automate hyperparameter tuning for deep neural network training, which is traditionally a manual process of a data scientist.

While AutoML tools exist for assisting with hyperparameter tuning, it can be appreciated that the process of identifying optimized hyperparameter settings is still a time consuming and computation intensive process. That is, each hyperparameter has a set of possible values, and there are multiple hyperparameters that are set for most machine learning computer models. Given even a small set of hyperparameters for a machine learning computer model (hereafter referred to simply as a "model" or "ML model") the task of evaluating each combination of each possible hyperparameter value takes significant time and computation. For example, consider a machine learning computer model for text classification for a chatbot service, i.e. a machine learning computer model that receives input text and classifies the key terms/phrases in the input text into one of a plurality of possible subject matter classifications. Such a machine learning computer model may have, for example, six main hyperparameters: penalty term, kernel, degree, scale, tolerance, and class size. Each of these six hyperparameters may be any of a plurality of different values. For each combination of each of the six hyperparameters, in order to determine whether that particular set of values for the size hyperparameters provides an improvement in the performance of the ML model, the ML model must be configured with the selected set of hyperparameters and run on one or more training data to generate output results which can then be used to determine the performance of the ML model, e.g., accuracy of the ML model as determined from the loss function of the ML model and the ground truth of the training data Doing this for each possible combination of hyperparameter value settings takes considerable time and computational effort. This is exacerbated when one recognizes that for the same ML model, the optimum hyperparameter value settings may be different for different domains, and modern datasets often comprise data of different domains, i.e. are mixed domain datasets.

The illustrative embodiments augment the AutoML process by providing mechanisms for improving parameter sampling operations, such as hyperparameter sampling, in the AutoML process, i.e. determining what settings of parameters to evaluate to determine a best performance set of parameters for configuring the machine learning model. These parameters may be any parameters of a machine learning (ML) model, such as hyperparameters, internal parameters of the ML model such as individual weight values for various features of an input dataset evaluated by the ML model, or the like. Any other parameters of a ML model that may be learned through an AutoML process are also considered to be within the spirit and scope of the present invention with regard to the improvements of the AutoML parameter sampling provided by the mechanisms of the illustrative embodiments.

The mechanisms of the illustrative embodiments improve the parameter sampling stage of the AutoML process and provide a framework for scaling out and optimizing an AutoML process to a large number of datasets under constrained resources. The illustrative embodiments perform automated improvement of the parameter sampling in the AutoML process, based on historical performance, on a continuous or periodic basis. The illustrative embodiments train a parameter sampling configuration prediction model to predict, for each of one or more parameters of the ML model, a parameter sampling configuration to be implemented by the AutoML process, such as default value and upper/lower bounds (specifying a range) of the values for the parameter.

The parameter sampling configuration prediction model is trained, such as by using a regression analysis and a regression based machine learning model, to predict the parameter sampling configuration given a set of dataset characteristics information. That is, for an input dataset, the mechanisms of the illustrative embodiments analyze the input dataset to extract the characteristics of that dataset, which may be represented as a dataset characteristics data structure, e.g., a vector, table data structure entry, or the like. In addition, an initial AutoML process is performed on the dataset to identify learned values for the various parameters being evaluated by the AutoML process, thereby providing a learned values data structure output of the AutoML process. The data characteristics data structure is used as a set of independent variables (X) for the regression analysis, while the learned values data structure is used as the dependent variables (Y) for the regression analysis, such that the ML model parameter sampling configuration prediction model learns through a machine learning process and the regression analysis, patterns of X that predict settings of Y, i.e. the learned values data structure serves as the ground truth for the training of the ML model parameter sampling configuration prediction model which learns to predict Y given X through a backpropagation of the calculated loss of the ML model parameter sampling configuration prediction model.

This process of training is performed with regard to a plurality of input datasets which may have various different dataset characteristics and different learned parameters generated through the initial AutoML process performed on these other input datasets. Thus, various combinations of X's and Y's may be used as a basis for training the ML model parameter sampling configuration prediction model. This process may be repeated until the loss calculated for the ML model parameter sampling configuration prediction model is equal to or below an acceptable level, e.g., a threshold, until a predetermined amount of training time has expired, until there are no additional training datasets available, or any other suitable stopping criteria for terminating the initial training of the ML model parameter sampling configuration prediction model. However, as discussed hereafter, this training may be on-going at a later time after deployment of the trained ML model to a runtime environment, such that continuous or periodic updating of the AutoML process using the mechanisms of the illustrative embodiments is achieved.

Once the ML model parameter sampling configuration prediction model is initially trained, if the AutoML process is to be performed with regard to a new dataset, the AutoML process may be warm started by predicting the appropriate parameter sampling configuration for the parameters of the ML model. That is, the new dataset may be received and analyzed by the mechanisms of the illustrative embodiments to identify the new dataset's characteristics, i.e. X'. The new dataset characteristics X' may be input to the ML model parameter sampling configuration prediction model which then predicts the set of learned parameters that should be used as default parameters, as well as their upper/lower bounds, for parameter sampling during the AutoML process. This predicted parameter sampling configuration may then be used to configure the AutoML logic and thereby warm start the AutoML process such that the amount of resources and computation time required to perform the AutoML process are significantly reduced.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As mentioned above, the present invention is specifically directed to an improved computer tool that improves the performance of an AutoML process that optimizes the parameters of a machine learning (ML) model for a dataset. The present invention augments the AutoML process by providing an automated computing tool that determines the sampling configuration for sampling sets of parameters for determining an optimum set of parameters for a ML model. The sampling configuration is determined by training a ML model parameter sampling configuration prediction model to predict sampling configuration parameters for each of the parameters of an ML model that are to be optimized by an AutoML process based on input dataset characteristics.

Figure 1:
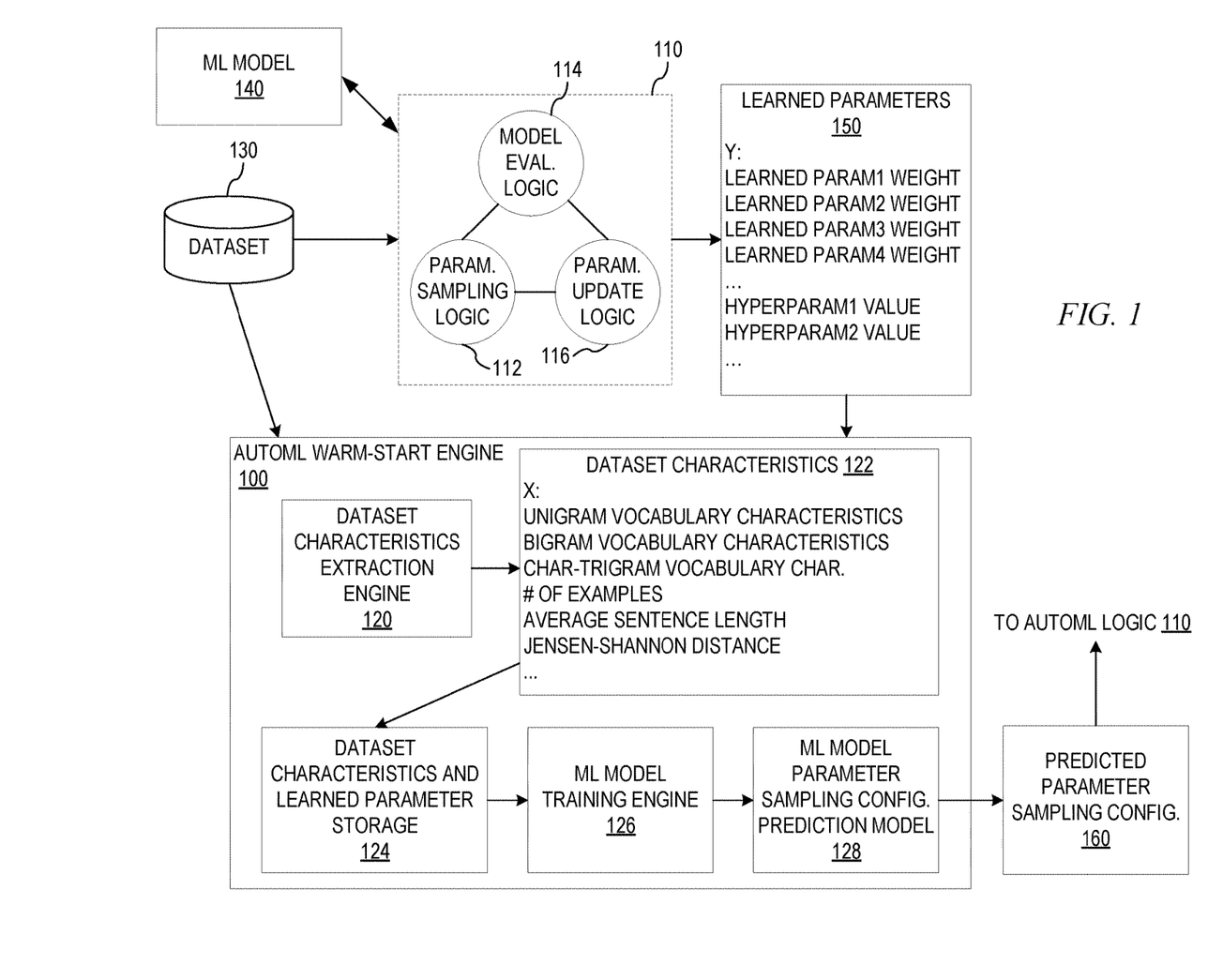
FIG. 1 is an example diagram illustrating a general overview of an automated machine learning (AutoML) warm-start engine and an augmented AutoML process in accordance with one illustrative embodiment.

FIG. 1 is an example diagram illustrating a general overview of An automated machine learning (AutoML) warm-start engine and an augmented AutoML process in accordance with one illustrative embodiment. As shown in FIG. 1, the AutoML process 110, comprises multiple stages of logic 112-116 which are repeatedly executed until the parameter value settings for the ML model 140, such as the hyperparameters, internal weights of the ML model, or the like, are optimized within a given constraint, e.g., a particular time constraint is met, a particular amount of improvement in the performance of the model is achieved, e.g., a loss or error, is equal to or less than a particular threshold, a particular amount of improvement in performance is not able to be achieved, such as may be determined from looking at multiple instances of training and seeing that the difference in performance does not equal or exceed a threshold, for example, or any other suitable stopping criteria for the AutoML process 110. Once the AutoML process 110 completes, a set of learned parameter values 150 are generated that provide an optimum performance of the ML model 140 during training of the ML model 140 and/or runtime deployment of the ML model 140 based on the input dataset(s) 130. That is, this set of learned parameters are learned from the AutoML process 110 and may be used to configure an instance of the ML model for training using a training dataset and/or in a runtime environment which processes new workloads using the trained ML model 140.

The augmented AutoML process of the illustrative embodiment as shown in FIG. 1 augments the AutoML process 110 by having a layer of automation, referred to as the AutoML warm-start engine 100, which operates to identify the sample configuration for sampling the parameters when performing the AutoML process 110, e.g., a default parameter value, a lower boundary of the parameter value, and an upper boundary of the parameter value, based on analysis of input datasets to identify characteristics of the datasets and their patterns which correlate to particular learned parameters 150 of the ML model 140. The AutoML warm-start engine 100 trains a ML model parameter sampling configuration prediction model 128 based on the extracted characteristics of the input dataset 130 and the learned parameters 150 obtained by an initial AutoML process 110 executed on the ML model 140 using the dataset(s) 130. Once trained, the ML model parameter sampling configuration prediction model 128 may be presented with the dataset characteristics for a new dataset and predict the appropriate sampling configuration for achieving an improved performance of the AutoML process 110, i.e. reducing the amount of computing resources and computing time to perform the AutoML process 110. Moreover, the AutoML warm-start engine 100 may automatically update the sampling configuration for sampling the parameters on a continuous or periodic basis such that the sampling configuration is kept up to date as new datasets are processed by the ML model 140.

It should be appreciated that FIG. 1 shows an example of an AutoML process 110 being used to identify learned parameters 150 for a text classification ML model 140. This is only an example and is not intended to state or imply any limitation of the present invention with regard to the types of machine learning models or AutoML process with which the illustrative embodiments of the present invention may be implemented. To the contrary, the mechanisms of the illustrative embodiments are applicable to any type of ML model and any AutoML process in which parameters of the ML model, e.g., hyperparameters, internal parameters of the ML model itself, such as weights of features, or the like, are learned through the AutoML process. For illustration purposes only, a text classification ML model 140 will be assumed, such as may be used in a chatbot service or other text classification service, but the selection of the text classification example is not intended to be limiting.

As shown in FIG. 1, the AutoML process 110 itself comprises a first stage logic 112, referred to as the parameter sampling stage logic 112, for sampling of parameters based on a prior understanding of the ML model 140. For example, an initial set of parameter values for N parameters of a ML model 140 may be set as beta=(param1, param2, . . . paramN), along with an initial upper bound and lower bound for each of these hyperparameter values. The initial values and initial upper and lower bounds for each of these hyperparameter values may be initially set by a subject matter expert (SME), for example.

The following operations are performed for each iteration of the AutoML process 110. The parameter sampling stage logic 112 identifies a listing of alternative sets of parameter values, e.g., beta*'s such as [beta*1, beta*2, beta*3, . . . ], which comprises each possible combination of the possible parameter values. It should be noted that the values of each of the parameter values must be within the lower/upper bound specified in the initial settings. The parameter sampling stage logic 112 also calculates acquisition function values for each of the sets of parameter values beta*1, beta*2, etc. such that for each beta*i, where i is the number of sets of parameters, there is an associated acquisition function value. The acquisition function value indicates the expected performance gain in the ML model 140 performance for a change of the parameter values to the values in the associated set of parameter values, i.e. the expected amount of gain in changing beta i to beta*i. The use of acquisition functions is generally known in the art and thus, a more detailed description is not provided herein.

Based on the acquisition function values associated with the various sets of parameter values, a next beta*i is selected for evaluating the performance of the ML model 140. The next beta*i that is selected for evaluation may be the beta*i that has not already been evaluated and which has a highest acquisition function value, for example. In other embodiments, the next beta*i selected for evaluation may be selected using other criteria, such as using a sampling probability [p1, p2, p3, . . . ] of the beta*i's where the sampling probability is calculated as a function of the acquisition function values for the different beta*i's.

Once a next beta*i is selected by the parameter sampling stage logic 112, the performance of the ML model 140, configured with the parameter values corresponding to the selected set of parameter values (beta*i), is evaluated with regard to one or more performance metrics of interest, e.g., accuracy of the output of the ML model 140 relative to a ground truth as may be measured by a loss function, for example. That is, the acquisition function value is a prediction of what performance improvement is expected or what performance improvement may be obtained by modifying the parameter values to the selected set of parameter values (beta*i). The ML model 140's actual performance still needs to be investigated to determine if an actual improvement in the performance of the ML model 140 is realized by the modification of the parameter values.

To evaluate the performance of the ML model 140, the AutoML process 110 comprises a second stage 114, referred to as the ML model 140 evaluation stage 114, having logic that configures the ML model 140 with the selected set of parameter values, and executes the ML model 140 on one or more input datasets 130. The one or more input datasets 130 comprise labeled data where the labels indicate a ground truth classification or output that is a correct output of a properly trained ML model given the corresponding input data of the dataset 130. This ground truth output may be compared to the actual output generated by the ML model 140 to evaluate a performance of the ML model 140 with regard to the correct output, e.g., a loss function may be used to calculate an error in the ML model 140 output, such as in a backpropagation based machine learning process. One or more performance metrics may be calculated based on the output of the ML model 140 and the particular training data used, such as accuracy of the output of the ML model 140 relative to the ground truth correct ML model output. The performance metric(s) may be compared to previously obtained performance metric(s) for a previous selected set of parameter values to determine if the performance metric(s) has/have improved.

This evaluation of improvement may be based on a predetermined function of the change in the performance metric(s). In the case of a single performance metric evaluation, the function may be based on the difference between the current performance metric and a previous performance metric. In the case of a plurality of performance metrics being evaluated, any desirable function of the differences in performance metrics may be utilized, e.g., a weighted evaluation of the differences between the performance metrics where a different weight may be applied to different performance metrics based on a desired implementation and a relative importance of the performance metric to the optimal performance of the ML model 140. The values generated by the function of the comparison of the performance metrics may be compared to one or more threshold values to determine if a significant enough improvement in performance has been achieved.

In a third stage 116 of the AutoML process 110, parameter update logic is provided for modifying the baseline set of parameter values against which the performance of other sets of parameter values are evaluated, in the case that a significant enough improvement in performance is achieved. That is, if a significant enough improvement has not been achieved, then the process may be repeated with the next selected set of parameter value settings without modifying the baseline set of parameters used for the comparison. If a significant enough improvement has been achieved then the selected set of parameter values, i.e. the selected beta*i, is used to replace the previous selected set of parameter values for configuring the ML model 140. This process may be repeated until a stopping criteria is achieved, e.g., a predetermined amount of execution time occurs, a predetermined level of performance of the ML model 140 is achieved, an amount of improvement in performance of the ML model 140 is not able to be achieved, or the like.

As noted previously, the evaluation of the possible sets of parameter values during an AutoML process requires a large amount of computational resources and time to accomplish. The illustrative embodiments provide an AutoML warm-start engine 100 that augments this AutoML process 110 by providing automated computer logic that improves the operation of the parameter sampling stage logic 112 by providing configuration information specifying default (initial) values and ranges, i.e. upper and lower bounds, for parameters for use in sampling parameter values for inclusion in the sets of parameter values, e.g., beta*1, beta*2, . . . beta*i, during the AutoML process 110. This identification of the sampling configuration information for configuring the parameter sampling stage logic 112 is based on the training of a machine learning model, referred to as the ML model parameter sampling configuration prediction model 128 in FIG. 1, to predict parameter sampling configuration information for a given set of dataset characteristics.

Thus, a more targeted evaluation of sets of parameter values is achieved which reduces the amount of computation resources needed and computation time need to identify a set of optimal parameter values for configuring the ML model 140. Moreover, this process may be performed automatically and continuously or periodically so as to maintain the parameter value selection for a ML model 140 to be the optimum set of hyperparameter values for the particular dataset(s) being processed by the ML model 140 as new datasets are received by the ML model 140.

As shown in FIG. 1, the primary operational components of an AutoML warm-start engine 100 of the illustrative embodiments includes a dataset characteristics extraction engine 120 that extracts dataset characteristics 122 from an input dataset 130, a dataset characteristics and learned parameter storage 124 that stores the extracted dataset characteristics 122 in association with learned parameters 150 obtained from an initial AutoML process 110 executed on the ML model 140 based on the input dataset 130, a ML model training engine 126 which provides logic for training a ML model based on the data stored in the dataset characteristics and learned parameter storage 124, and a ML model parameter sampling configuration prediction model 128 that is trained to predict a parameter sampling configuration 160 given dataset characteristics of an input dataset. It should be appreciated that the ML model parameter sampling configuration prediction model 128 is itself a machine learning model, such as a neural network, deep neural network, convolutional neural network, or other machine learning model, that is trained by the ML model training engine 126 to recognize patterns of dataset characteristics that are indicative of particular learned parameters 150 of the ML model 140.

As shown in FIG. 1, given a ML model 140 whose parameters are to be optimized using an AutoML process 110, and given a dataset 130 upon which the AutoML process 110 operates to determine learned parameters 150 of the ML model 140, such as in the manner previously described above, the AutoML process 110 is executed on the dataset 130 and ML model 140 to generate the learned parameters 150. The dataset 130 is also input to the AutoML warm-start engine 100 which analyzes the dataset 130 to extract dataset characteristics 122 that characterize the format and/or content of the dataset 130. That is, the dataset 130 is input to the dataset characteristics extraction engine 120 of the AutoML warm-start engine 100 which implements one or more analytics to analyze various aspects of the input dataset 130 and generate dataset characteristics 122 data. In the depicted example, assuming a text classification ML model 140 implementation and a dataset 130 comprising portions of text, for example, such as inputs that may be received by a chatbot service that implements the ML model 140, the text within the dataset 130 may be analyzed to identify various textual characteristics of the dataset including, but not limited to, unigram vocabulary characteristics (such as the number of unique unigrams present in the dataset 130), bigram vocabulary characteristics (such as the number of unique bigrams present in the dataset 130), character trigram vocabulary characteristics (such as the number of unique character trigrams in the dataset 130), a number of example portions of text present in the dataset 130, an average sentence length of the portions of text in the dataset 130, and the like.

Analytics for generating these dataset characteristics are generally known in natural language processing and textual analysis computer technology and thus, a more detailed description is not provided herein of each of these analytics. Examples of other possible dataset characteristics may include unigram entropy, unigram average variance, unigram max variance, as well as similar dataset characteristics for bigrams and character trigrams. In some illustrative embodiments, the dataset characteristics may include a Jensen-Shannon distance of a probability distribution of the labels present in the dataset 130. For example, this Jensen-Shannon distance may be calculated by comparing the label distribution against a uniform distribution to measure label imbalance. Of course, other dataset characteristics may also be used without departing from the spirit and scope of the present invention. For some dataset characteristics probability inputs may be derived by occurrence/total—examples for each unigram, bigram, and/or character trigram, for example.

As a result of the analytics applied by the dataset characteristics extraction engine 120, the set of dataset characteristics 122 are generated for the input dataset 130. These dataset characteristics 122 may be stored as part of a data structure in the dataset characteristics and learned parameter storage 124. For example, the dataset characteristics 122 may be output as a vector data structure by the dataset characteristics extraction engine 120 and this vector data structure may be stored in the storage 124. In another illustrative embodiments, the storage 124 may store a table data structure for the dataset 130 in which entries in the table may correspond to one or more of the dataset characteristics 122. Any suitable data structure for storing the dataset characteristics 122 may be used without departing from the spirit and scope of the present invention. In some illustrative embodiments, the dataset characteristics 122 are stored in the storage 124 as part of a data structure that is associated with an identifier of the dataset 130.

In addition to the dataset characteristics 122, the storage 124 may also store the learned parameters 150 generated by the initial AutoML process 110 preformed on the ML model 140 using the dataset 130. The learned parameters 150 may be stored in the storage 124 as a data structure, e.g., vector data structure, table entry, etc., in association with the dataset characteristics data structure and/or the identifier of the dataset 130. In this way, a correlation between the dataset 130, the dataset characteristics 122, and the learned parameters 150 may be maintained in the storage 124 for use in training the ML model parameter sampling configuration prediction model 128.

It should also be appreciated that while FIG. 1 shows these elements and the operation of the illustrative embodiments with regard to a single dataset 130, the mechanisms may operate on multiple datasets 130 with each operation causing a different correlation of dataset characteristics 122 and learned parameters 150 being stored in the dataset characteristics and learned parameter storage 124 in association with an identifier of the dataset 130 with which they correspond. The ML model training engine 126 provides logic for performing machine learning operations with regard to a ML model parameter sampling configuration prediction model 128 using the data characteristics and learned parameters stored in the storage 124 as training data.

That is, the ML model training engine 126 trains a ML model to predict sampling configuration parameters based on the dataset characteristics as input to the ML model. Thus, the ML model training engine 126 inputs the dataset characteristics into a ML model which operates on the dataset characteristics using an initial configuration of the ML model, and generates an output of predicted learned parameters. The predicted learned parameters are compared to the stored learned parameters corresponding to the input dataset characteristics, in order to determine an error or loss. Thereafter, through a regression based machine learning, modifications to operational parameters of the ML model are modified to reduce this loss or error, and the process may be repeated iteratively until the training of the ML model converges or a predetermined amount of time/iterations expires. In this way, the ML model learns an association in which given an input X (dataset characteristics 122), the ML model predicts an output Y (learned parameters of an AutoML process 110).

It should be appreciated that the learned parameters predicted by the ML model represent default values for the parameter sampling logic 112 of the AutoML process 110. The upper and lower bounds of the parameter sampling may be calculated as a function of these default values. Thus, for example, in one illustrative embodiment, the upper and lower bounds may be calculated based on the predicted variance of the default values. For each prediction of a default value, there is an associated predicted variance, i.e. the uncertainty associated with the prediction, which may be used to set the upper and lower bounds for the parameter sampling. Other ways of determining the lower/upper bounds may include determining the lower/upper quantile of the prediction if the underlying prediction model is an ensemble model, e.g., in a random forest based prediction model, each decision tree has an individual prediction and 10%/90% percentile of these predictions may be used as an upper/lower bound.

Once the ML model, referred to as the ML model parameter sampling configuration prediction model 128, is trained by the ML model training engine 126, the model 128 may be used with new datasets for the ML model 140 to generate predicted parameter sampling configuration information 160 that may be used to configure the parameter sampling logic 112 of the AutoML process 110. Thus, given a new dataset, the dataset characteristics extraction engine 120 determines the dataset characteristics of the new dataset, inputs those into the model 128, which then predicts the parameter sampling configuration information 160 that is then used to configure the parameter sampling logic 112 of the AutoML process 110.

It should be appreciated that there may be a different ML model parameter sampling configuration prediction model 128 for each ML model 140. That is, because different ML models 140 operate in different ways, the learned parameters 150 generated by the AutoML process 110 may be different. Thus, there may be a different learned correlation between input dataset characteristics and parameter sampling configuration information for the AutoML process 110 for the ML model 140.

Figure 2:
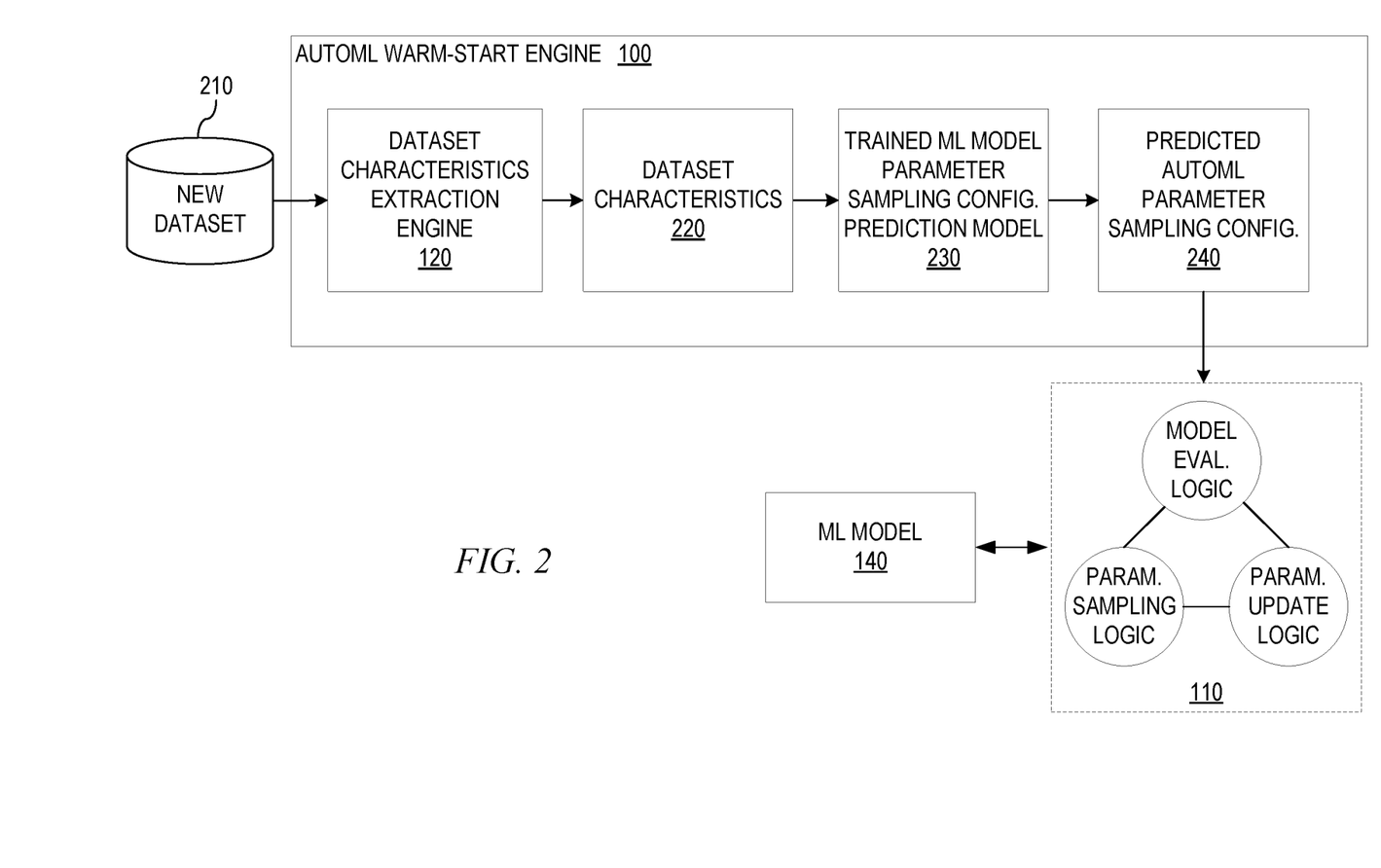
FIG. 2 is an example diagram illustrating an example operation of the AutoML warm-start engine with regard to predicting an initial configuration of AutoML parameters sampling parameters for a new dataset input in accordance with one illustrative embodiment.

FIG. 2 is an example diagram illustrating an example operation of the AutoML warm-start engine with regard to predicting an initial configuration of AutoML parameters sampling parameters for a new dataset input in accordance with one illustrative embodiment. As shown in FIG. 2, the new dataset 210 is input to the AutoML warm-start engine 100 of the illustrative embodiments. This may be done prior to performing an AutoML process. That is, while during training of the ML model parameter sampling configuration prediction model 128 the dataset 130 may be provided to both the AutoML logic 112-116 performing an initial AutoML process 110 and the AutoML warm-start engine 100, so as to generate the learned parameters 150 and the dataset characteristics 122 for training the model 128, during runtime operation, the trained model is used to configure the AutoML logic 112-116 prior to performing the AutoML process 110 and thereby provide a warm-start of the AutoML process 110 that provides a more targeted sampling of the parameter values for performance of the AutoML process 110.

Thus, as shown in FIG. 2, the new dataset 210 is input to the AutoML warm-start engine 100 which processes the dataset via the dataset characteristics extraction engine 120 to extract the dataset characteristics 220 for the new dataset 210. The dataset characteristics 220 are input to the already trained ML model parameter sampling configuration prediction model 230, trained in a manner as discussed above, for example. The trained ML model parameter sampling configuration prediction model 230 generates predicted AutoML parameter sampling configuration information 240, e.g., default value(s) of parameters to be learned via the AutoML process 110 and ranges (upper/lower bounds) of the parameter values. The predicted AutoML parameter sampling configuration information 240 is input to the AutoML logic 112-116 for configuring the AutoML logic. In particular, the predicted AutoML parameter sampling configuration information 240 may be used to configure the parameter sampling logic 112 of the AutoML logic 112-116. The AutoML logic 112-116 then performs an AutoML process 110 on the ML model 140 to determine the learned values for configuring the ML model 140. It should be appreciated that the AutoML process 110 in this case will require fewer computing resources and computational time to converge the AutoML process 110 to the learned values due to the warm-start based configuration of the AutoML parameter sampling logic 112 by the AutoML warm-start engine 100.

Figure 3:
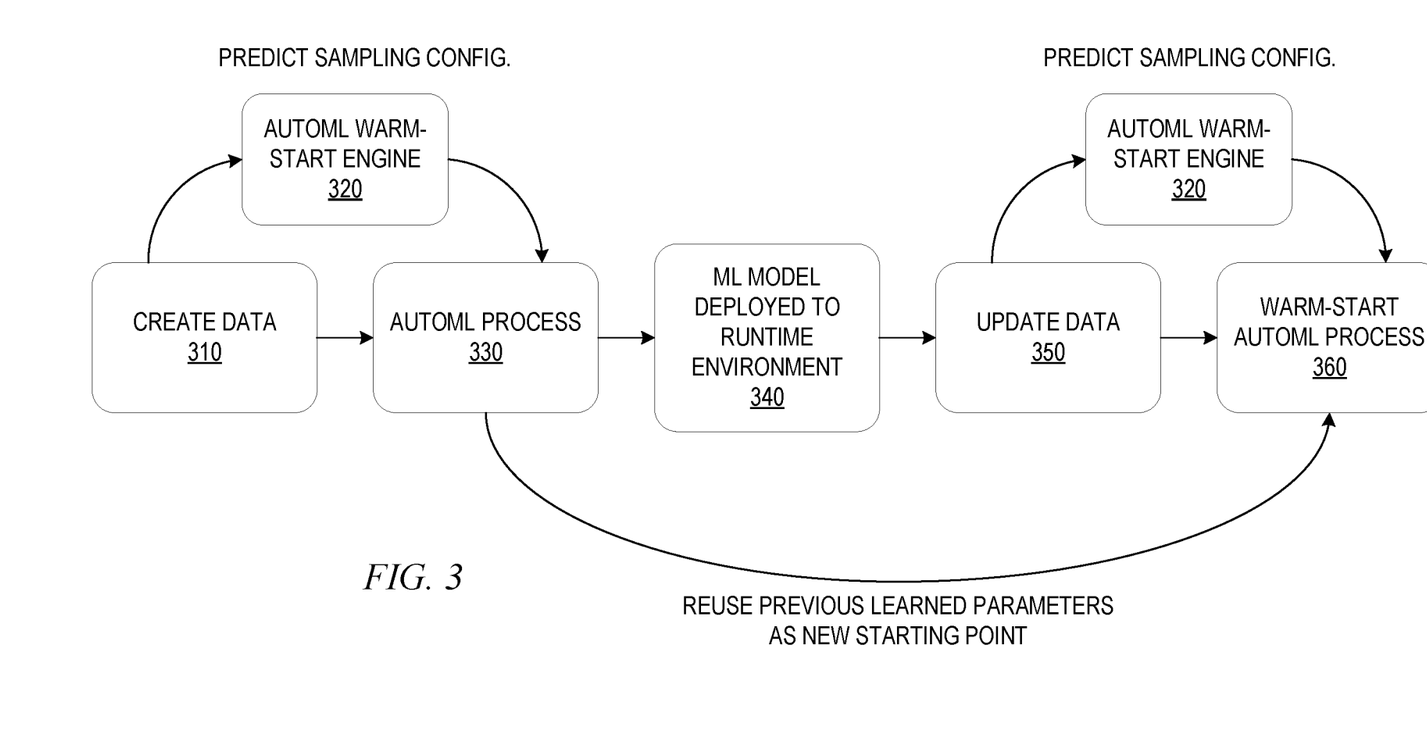
FIG. 3 is an example diagram illustrating a process for dynamic updating of an AutoML parameter sampling configuration after deployment of a trained ML model in accordance with one illustrative embodiment.

FIG. 3 is an example diagram illustrating a process for dynamic updating of an AutoML parameter sampling configuration after deployment of a trained ML model in accordance with one illustrative embodiment. As shown in FIG. 3, after training of the ML model parameter sampling configuration prediction model of the AutoML warm-start engine 320, a new dataset 310 may be created and provided to the AutoML warm-start engine 320 to predict the sampling configuration that is then used to configure the AutoML process 330 which then determines the parameter values for configuring the ML model. The configured ML model is deployed to a runtime environment 340.

At a later time, the dataset used by the ML model may be updated 350. For example, if the ML model is a text classification ML model which is trained on a predetermined set of recognizable textual content, during runtime operation of the ML model, new textual content may be encountered which may be used to update the original created dataset 310. For example, a user may define a chatbot that is designed to handle domestic airline ticket sales within the United States of America. At a later time, the user may want to expand the scope of the chatbot to also handle flights between Canada and the United States of America. The user may start by adding examples of new textual content, such as "I want to book a flight from Boston to Toronto", or the like. These additional examples constitute an expansion or update of the dataset used by the ML model to thereby generate an updated dataset 350.

Based on the updated dataset 350, the AutoML warm-start engine 360 is again employed to provide a warm-start parameter sampling configuration based on the characteristics of the updated dataset 350. The warm-start parameter sampling configuration is input to the warm-start AutoML process 370 to thereby configure the AutoML parameter sampling logic in a similar manner as was done during the AutoML process 330 to thereby perform the warm-start AutoML process 360. This process may be repeated each time there is a new update 350 to the dataset such that there may be a continuous updating of the parameters of the ML model through an updated AutoML process. Alternatively, the process may be performed periodically, such that updates to the dataset may be accumulated over a period of time and then used to update the AutoML process 360 and ultimately the parameter values of the ML model. For example, this periodic updating may be performed in response to the elapsing of a particular amount of time since a last update, a particular amount of data being modified in the dataset, or any other triggering criteria indicating a need or desire to update the setting of the ML model parameters via an AutoML process.

With the updated AutoML process 360, the ML model may be initially configured with the parameter values learned as part of the previous AutoML process. For example, at stage 310 in FIG. 3, a user may create the data, but at this point the AutoML warm-start engine 320 does not exist because that is no previous AutoML process that was completed. As a result, the process goes to stage 330 and the performance of the initial training of the AutoML warm-start engine 320 via the AutoML process 330. After this training, the ML model is deployed to run-time in stage 340. While, later the user may decide to edit the data for any of a plethora of possible reasons, e.g., business related reasons where they want to expand the scope of the ML model, correcting errors in textual content, or the like. As a result, the dataset changes and a new trained ML model is needed. However, instead of going straight into the AutoML process 330, the mechanisms of the illustrative embodiments utilize a memory of the previous training of the ML model. The new default values may be the previous learned values. The effect of how much the reusing of the previous learned values with regard to speeding up the AutoML process depends on the how much change actually happens. For most minor changes, the previous learned values are very closed to the new learned values.

Figure 4:
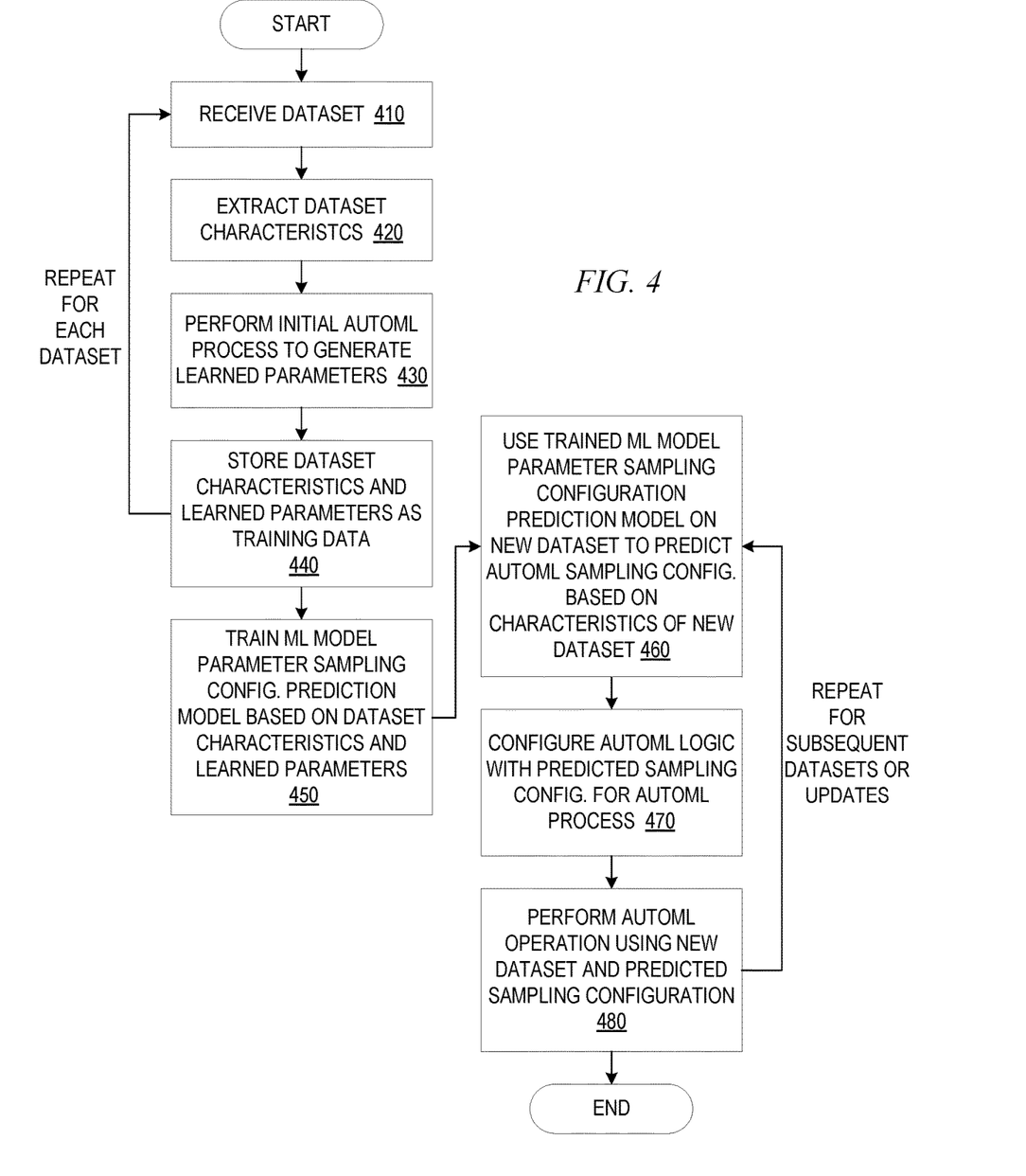
FIG. 4 is a flowchart outlining an example operation of an AutoML warm-start engine in accordance with one illustrative embodiment.

FIG. 4 is a flowchart outlining an example operation of an AutoML warm-start engine in accordance with one illustrative embodiment. As shown in FIG. 4, the operation starts by receiving a dataset (step 410) on which the AutoML warm-start engine performs analytics to extract dataset characteristics (step 420). In addition, an initial AutoML process is performed on an ML model using the received dataset to generate learned parameters (step 430). The learned parameters and the dataset characteristics are stored as part of training data for training the ML model parameter sampling configuration prediction model (step 440). This process of steps 410-440 may be repeated for each dataset received such that training data is generated based on one or more datasets.

Given the training data comprising the dataset characteristics and their corresponding learned parameters, a ML model parameter sampling configuration prediction model is trained using a machine learning operation, e.g., regression based machine learning using backpropagation (step 450). The trained ML model parameter sampling configuration prediction model is then deployed and used in a runtime environment on a new dataset to predict an AutoML sampling configuration for performing an AutoML operation to configure an ML model (step 460). The AutoML logic is configured with the predicted sampling configuration information for the AutoML process (step 470) and the AutoML operation is performed on the ML model using the new dataset and the predicted sampling configuration information (step 480). This process of steps 460-480 may be repeated for each subsequent dataset or update to the dataset, such as on a continuous or periodic basis. The operation then terminates.

From the above description, it is apparent that the present invention is specifically concerned with addressing the problems of automated machine learning to identify optimum parameter values for the configuration of machine learning models. This is a problem that arises specifically from machine learning computer technology. The solution provided by the present invention is a specific computing tool that provides a specific technological solution for improving the way in which automated machine learning (AutoML) is performed with regard to machine learning models.

Figure 5:
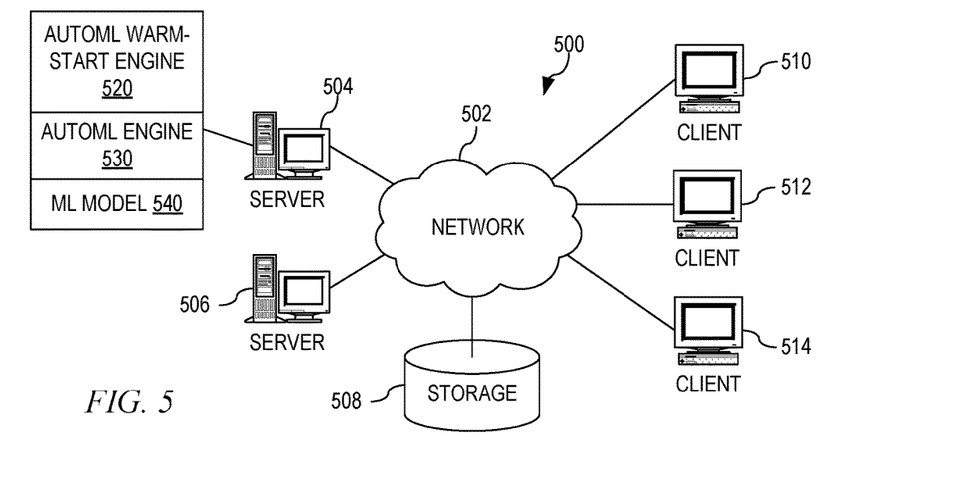
FIG. 5 is an example diagram of a distributed data processing system in which aspects of the illustrative embodiments may be implemented.
Figure 6:
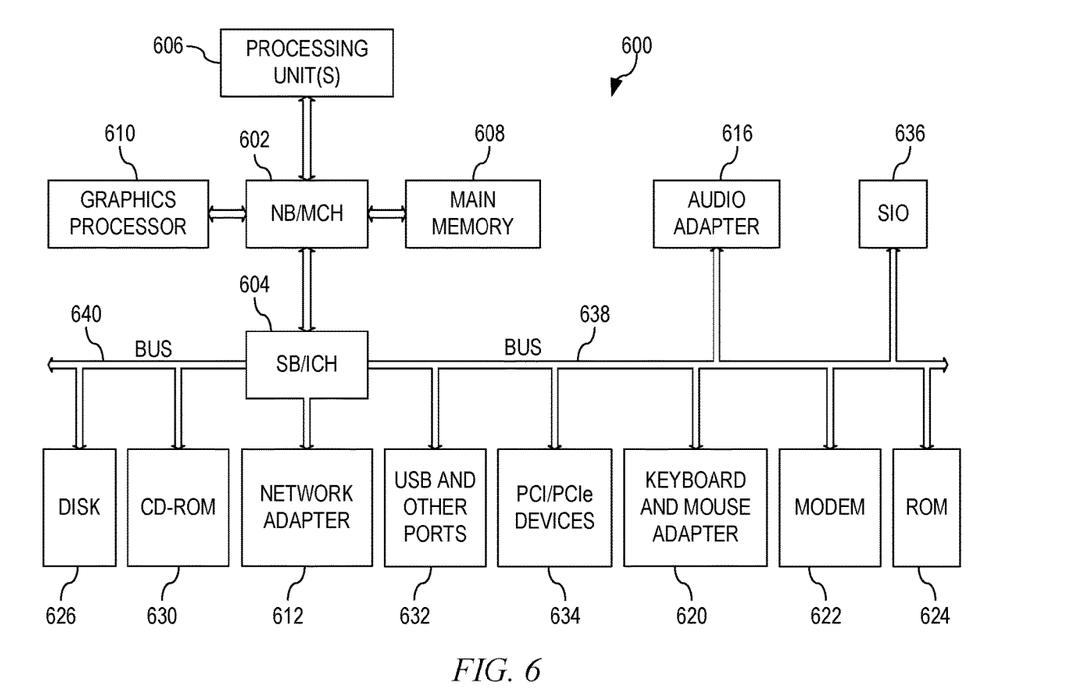
FIG. 6 is an example block diagram of a computing device in which aspects of the illustrative embodiments may be implemented.

In view of the above, it can be appreciated that the illustrative embodiments may be utilized in many different types of data processing environments. In order to provide a context for the description of the specific elements and functionality of the illustrative embodiments, FIGS. 5 and 6 are provided hereafter as example environments in which aspects of the illustrative embodiments may be implemented. It should be appreciated that FIGS. 5 and 6 are only examples and are not intended to assert or imply any limitation with regard to the environments in which aspects or embodiments of the present invention may be implemented. Many modifications to the depicted environments may be made without departing from the spirit and scope of the present invention.

FIG. 5 depicts a pictorial representation of an example distributed data processing system in which aspects of the illustrative embodiments may be implemented. Distributed data processing system 500 may include a network of computers in which aspects of the illustrative embodiments may be implemented. The distributed data processing system 500 contains at least one network 502, which is the medium used to provide communication links between various devices and computers connected together within distributed data processing system 500. The network 502 may include connections, such as wire, wireless communication links, or fiber optic cables.

In the depicted example, server 504 and server 506 are connected to network 502 along with storage unit 508. In addition, clients 510, 512, and 514 are also connected to network 502. These clients 510, 512, and 514 may be, for example, personal computers, network computers, or the like. In the depicted example, server 504 provides data, such as boot files, operating system images, and applications to the clients 510, 512, and 514. Clients 510, 512, and 514 are clients to server 504 in the depicted example. Distributed data processing system 500 may include additional servers, clients, and other devices not shown.

In the depicted example, distributed data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 500 may also be implemented to include a number of different types of networks, such as for example, an intranet, a local area network (LAN), a wide area network (WAN), or the like. As stated above, FIG. 5 is intended as an example, not as an architectural limitation for different embodiments of the present invention, and therefore, the particular elements shown in FIG. 5 should not be considered limiting with regard to the environments in which the illustrative embodiments of the present invention may be implemented.

As shown in FIG. 5, one or more of the computing devices, e.g., server 504, may be specifically configured to implement an AutoML warm-start engine 520, AutoML engine 530, and ML model 540. The AutoML warm-start engine 520 is specifically configured to perform the operations described above with regard to one or more of the illustrative embodiments and to operate in conjunction with the AutoML engine 530 that performs operations described above with regard to the AutoML process, such as AutoML process 110, using the ML model 540. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 504, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates the improved parameter sampling during an AutoML process using a trained ML model parameter sampling configuration prediction model to generate parameter sampling configuration parameters for configuring the AutoML logic as described previously.

For example, in one illustrative embodiment, datasets for processing by a ML model 540 may be provided by one or more dataset sources, such as a client computing device 510, server computing device 506, network storage system, or the like. During a training operation, these datasets may be labeled datasets that are used to train the AutoML warm-start engine 520 by extracting dataset characteristics and correlating these dataset characteristics with learned parameter values generated by an initial AutoML process. Thereafter, the dataset may be an unlabeled dataset that is processed by the trained ML model parameter sampling configuration prediction model 128 of the AutoML warm-start engine 520 to update the parameter sampling configuration parameters for configuring AutoML logic to perform a subsequent AutoML process and thereby update the ML model's parameters.

As noted above, the mechanisms of the illustrative embodiments utilize specifically configured computing devices, or data processing systems, to perform the operations for augmenting and improving the parameter sampling performed by an AutoML process. These computing devices, or data processing systems, may comprise various hardware elements which are specifically configured, either through hardware configuration, software configuration, or a combination of hardware and software configuration, to implement one or more of the systems/subsystems described herein. FIG. 6 is a block diagram of just one example data processing system in which aspects of the illustrative embodiments may be implemented. Data processing system 600 is an example of a computer, such as server 504 in FIG. 5, in which computer usable code or instructions implementing the processes and aspects of the illustrative embodiments of the present invention may be located and/or executed so as to achieve the operation, output, and external effects of the illustrative embodiments as described herein.

In the depicted example, data processing system 600 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 626 and CD-ROM drive 630 may use, for example, an integrated drive electronics (IDE) or serial advanced technology attachment (SATA) interface. Super I/O (SIO) device 636 may be connected to SB/ICH 604.

An operating system runs on processing unit 606. The operating system coordinates and provides control of various components within the data processing system 600 in FIG. 6. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 600.

As a server, data processing system 600 may be, for example, an IBM eServer™ System P® computer system, Power™ processor based computer system, or the like, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as HDD 626, and may be loaded into main memory 608 for execution by processing unit 606. The processes for illustrative embodiments of the present invention may be performed by processing unit 606 using computer usable program code, which may be located in a memory such as, for example, main memory 608, ROM 624, or in one or more peripheral devices 626 and 630, for example.

A bus system, such as bus 638 or bus 640 as shown in FIG. 6, may be comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, may include one or more devices used to transmit and receive data. A memory may be, for example, main memory 608, ROM 624, or a cache such as found in NB/MCH 602 in FIG. 6.

As mentioned above, in some illustrative embodiments the mechanisms of the illustrative embodiments may be implemented as application specific hardware, firmware, or the like, application software stored in a storage device, such as HDD 626 and loaded into memory, such as main memory 608, for executed by one or more hardware processors, such as processing unit 606, or the like. As such, the computing device shown in FIG. 6 becomes specifically configured to implement the mechanisms of the illustrative embodiments and specifically configured to perform the operations and generate the outputs described herein with regard to the one or more of the AutoML warm-start engine 520, the AutoML engine 530, and the ML model 540. It should be appreciated that different computing devices may be used to implement different ones of the AutoML warm-start engine 520, the AutoML engine 530, and the ML model 540, and may be configured to operate in conjunction with one another to facilitate the operations previously described above with regard to one or more of the illustrative embodiments described with reference to FIGS. 1-5.

Those of ordinary skill in the art will appreciate that the hardware in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6. Also, the processes of the illustrative embodiments may be applied to a multiprocessor data processing system, other than the SMP system mentioned previously, without departing from the spirit and scope of the present invention.

Moreover, the data processing system 600 may take the form of any of a number of different data processing systems including client computing devices, server computing devices, a tablet computer, laptop computer, telephone or other communication device, a personal digital assistant (PDA), or the like. In some illustrative examples, data processing system 600 may be a portable computing device that is configured with flash memory to provide non-volatile memory for storing operating system files and/or user-generated data, for example. Essentially, data processing system 600 may be any known or later developed data processing system without architectural limitation.

Thus, the illustrative embodiments provide mechanisms for improving the parameter sampling operations in the AutoML process, i.e. determining what sets of parameters to evaluate to determine a best performance set of parameters for configuring the machine learning model. The mechanisms of the illustrative embodiments improve the parameter sampling stage of the AutoML process and provide a framework for scaling out and optimizing an AutoML process to a large number of datasets under constrained resources. The illustrative embodiments perform automated improvement of the parameter sampling in the AutoML process, based on historical performance, on a continuous or periodic basis. The illustrative embodiments utilize a trained machine learning model to predict parameter sampling configuration information given characteristics of a dataset. As a result, the mechanisms of the illustrative embodiments reduce computational time and resources used to identify optimum parameter settings for training an ML model.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing an automated machine learning (AutoML) operation to configure parameters of a first machine learning model, the method comprising:
   configuring AutoML logic based on an initial parameter sampling configuration information for sampling values of at least one parameter of the first machine learning (ML) model;
   executing an initial AutoML process on the first ML model based on a dataset utilizing the initially configured AutoML logic, to generate at least one learned value for the at least one parameter of the first ML model, wherein the at least one parameter is a configuration parameter that configures the first ML model to be a trained ML model;
   analyzing the dataset to extract a set of dataset characteristics that define properties of at least one of a format or a content of the dataset;
   storing the set of dataset characteristics in association with the at least one learned value as part of a training dataset; and
   training a second ML model, different from the first ML model, based on the training dataset to predict, for new datasets, corresponding new sampling configuration information based on characteristics of the new datasets, to thereby generate a trained second ML model, wherein the training trains the second ML model to learn a correspondence between sets of dataset characteristics in the training dataset and learned values of parameters of the first ML model in the training dataset, to thereby predict at least one initial value for the at least one parameter based on the learned correspondence, and wherein the new sampling configuration information comprises at least one initial value for the at least one parameter and at least one bound for sampling values of the at least one parameter based on the at least one initial value, during a subsequent AutoML process executed by the AutoML logic.

2. The method of claim 1, further comprising:
   receiving a new dataset;
   analyzing the new dataset to extract a new set of dataset characteristics;
   inputting the new set of dataset characteristics into the trained second ML model which processes the new set of dataset characteristics to predict the new sampling configuration information;
   configuring the AutoML logic with the new sampling configuration information; and
   executing the AutoML logic on the first ML model based on the new dataset and the new sampling configuration information.

3. The method of claim 2, wherein the AutoML logic comprises parameter sampling logic, model evaluation logic, and parameter update logic, and wherein configuring the AutoML logic comprises configuring the parameter sampling logic to utilize the new sampling configuration information to control sampling of values for the at least one parameter of the first ML model.

4. The method of claim 2, wherein predicting the new sampling configuration information comprises, for each parameter of the at least one parameter of the first ML model, predicting a learned value for the parameter and generating an upper bound and a lower bound for sampling values for the parameter based on functions of the predicted learned value for the parameter.

5. The method of claim 2, further comprising, in response to executing the AutoML logic on the first ML model based on the new dataset and the new sampling configuration information:
   updating the training dataset with results of executing the AutoML logic on the first ML model based on the new dataset and the new sampling configuration information, to generate an updated training dataset; and
   retraining the trained second ML model by performing a machine learning training of the trained second ML model using the updated training dataset.

6. The method of claim 1, wherein executing the initial AutoML process on the first ML model based on the dataset, analyzing the dataset to extract the set of dataset characteristics, and storing the set of dataset characteristics in association with the at least one learned value as part of a training dataset are performed for a plurality of datasets such that the training dataset comprises a plurality of associations of sets of dataset characteristics with learned values.

7. The method of claim 1, wherein the first ML model is a text classification ML model, the dataset comprises portions of text, and wherein the set of dataset characteristics comprise textual metrics.

8. The method of claim 7, wherein the textual metrics comprise at least one of unigram vocabulary characteristics, bigram vocabulary characteristics, character-trigram characteristics, a number of examples present in the dataset, an average sentence length of the dataset, or a distance metric of a distribution of terms in the dataset.

9. The method of claim 1, wherein the at least one parameter comprises one or more weights associated with features evaluated by the first ML model.

10. The method of claim 1, wherein the at least one parameter comprises a hyperparameter of the first ML model.

11. A computer program product comprising a computer readable storage medium having a computer readable program stored therein, wherein the computer readable program, when executed on a computing device, causes the computing device to:

configure AutoML logic based on an initial parameter sampling configuration information for sampling values of at least one parameter of a first machine learning (ML) model;
execute an initial AutoML process on the first ML model based on a dataset utilizing the initially configured AutoML logic, to generate at least one learned value for the at least one parameter of the first ML model, wherein the at least one parameter is a configuration parameter that configures the first ML model to be a trained first ML model;
analyze the dataset to extract a set of dataset characteristics that define properties of at least one of a format or a content of the dataset;
store the set of dataset characteristics in association with the at least one learned value as part of a training dataset; and
train a second ML model, different from the first ML model, based on the training dataset to predict, for new datasets, corresponding new sampling configuration information based on characteristics of the new datasets, to thereby generate a trained second ML model, wherein the training trains the second ML model to learn a correspondence between sets of dataset characteristics in the training dataset and learned values of parameters of the first ML model in the training dataset, to thereby predict at least one initial value for the at least one parameter based on the learned correspondence, and wherein the new sampling configuration information comprises at least one initial value for the at least one parameter and at least one bound for sampling values of the at least one parameter based on the at least one initial value, during a subsequent AutoML process executed by the AutoML logic.

12. The computer program product of claim 11, wherein the computer readable program further causes the computing device to:
receive a new dataset;
analyze the new dataset to extract a new set of dataset characteristics;
input the new set of dataset characteristics into the trained second ML model which processes the new set of dataset characteristics to predict the new sampling configuration information;
configure the AutoML logic with the new sampling configuration information; and
execute the AutoML logic on the first ML model based on the new dataset and the new sampling configuration information.

13. The computer program product of claim 12, wherein the AutoML logic comprises parameter sampling logic, model evaluation logic, and parameter update logic, and wherein configuring the AutoML logic comprises configuring the parameter sampling logic to utilize the new sampling configuration information to control sampling of values for the at least one parameter of the first ML model.

14. The computer program product of claim 12, wherein predicting the new sampling configuration information comprises, for each parameter of the at least one parameter of the first ML model, predicting a learned value for the parameter and generating an upper bound and a lower bound for sampling values for the parameter based on functions of the predicted learned value for the parameter.

15. The computer program product of claim 12, wherein the computer readable program further causes the computing device, in response to executing the AutoML logic on the first ML model based on the new dataset and the new sampling configuration information, to:
update the training dataset with results of executing the AutoML logic on the first ML model based on the new dataset and the new sampling configuration information, to generate an updated training dataset; and
retrain the trained second ML model by performing a machine learning training of the trained second ML model using the updated training dataset.

16. The computer program product of claim 11, wherein executing the initial AutoML process on the first ML model based on the dataset, analyzing the dataset to extract the set of dataset characteristics, and storing the set of dataset characteristics in association with the at least one learned value as part of a training dataset are performed for a plurality of datasets such that the training dataset comprises a plurality of associations of sets of dataset characteristics with learned values.

17. The computer program product of claim 11, wherein the first ML model is a text classification ML model, the dataset comprises portions of text, and wherein the set of dataset characteristics comprise textual metrics.

18. The computer program product of claim 17, wherein the textual metrics comprise at least one of unigram vocabulary characteristics, bigram vocabulary characteristics, character-trigram characteristics, a number of examples present in the dataset, an average sentence length of the dataset, or a distance metric of a distribution of terms in the dataset.

19. The computer program product of claim 11, wherein the at least one parameter comprises at least one of a hyperparameter of the first ML model or one or more weights associated with features evaluated by the first ML model.

20. An apparatus comprising:
a processor; and
a memory coupled to the processor, wherein the memory comprises instructions which, when executed by the processor, cause the processor to:
configure AutoML logic based on an initial parameter sampling configuration information for sampling values of at least one parameter of a first machine learning (ML) model;
execute an initial AutoML process on the first ML model based on a dataset utilizing the initially configured AutoML logic, to generate at least one learned value for the at least one parameter of the first ML model, wherein the at least one parameter is a configuration parameter that configures the first ML model to be a trained first ML model;
analyze the dataset to extract a set of dataset characteristics that define properties of at least one of a format or a content of the dataset;
store the set of dataset characteristics in association with the at least one learned value as part of a training dataset; and
train a second ML model, different from the first ML model, based on the training dataset to predict, for new datasets, corresponding new sampling configuration information based on characteristics of the new datasets, to thereby generate a trained second ML model, wherein the training trains the second ML model to learn a correspondence between sets of dataset characteristics in the training dataset and learned values of parameters of the first ML model in the training dataset, to thereby predict at least one initial value for the at least one parameter based on the learned correspondence, and wherein the new sampling configuration information comprises at least one initial value for the at least one parameter and at least one bound for sampling values of the at least one parameter based on the at least one initial value, during a subsequent AutoML process executed by the AutoML logic.

\* \* \* \* \*